US009645401B2

(12) United States Patent
Nishiwaki et al.

(10) Patent No.: US 9,645,401 B2
(45) Date of Patent: May 9, 2017

(54) IMAGE DISPLAY DEVICE COMPRISING BEAM SPLITTER

(71) Applicant: Panasonic Intellectual Property Management Co., Ltd., Osaka (JP)

(72) Inventors: Seiji Nishiwaki, Hyogo (JP); Takeyoshi Tokuhara, Osaka (JP); Yoshio Shimbo, Osaka (JP); Tsuguhiro Korenaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 13 days.

(21) Appl. No.: 14/955,083

(22) Filed: Dec. 1, 2015

(65) Prior Publication Data

US 2016/0161753 A1 Jun. 9, 2016

(30) Foreign Application Priority Data

Dec. 8, 2014 (JP) ................................. 2014-248347

(51) Int. Cl.
| | | |
|---|---|---|
| *G02B 27/10* | (2006.01) | |
| *G02B 27/22* | (2006.01) | |
| *H04N 13/04* | (2006.01) | |
| *G02B 3/00* | (2006.01) | |
| *G02B 27/14* | (2006.01) | |
| *G02B 17/08* | (2006.01) | |

(52) U.S. Cl.
CPC ....... *G02B 27/2214* (2013.01); *G02B 3/0043* (2013.01); *H04N 13/044* (2013.01); *H04N 13/0406* (2013.01); *H04N 13/0443* (2013.01); *G02B 17/0856* (2013.01); *G02B 27/144* (2013.01)

(58) Field of Classification Search
USPC .................................................. 359/619–628
See application file for complete search history.

(56) References Cited

U.S. PATENT DOCUMENTS 5,838,494 A 11/1998 Araki

FOREIGN PATENT DOCUMENTS

| JP | 8-194273 | 7/1996 |
|---|---|---|
| JP | 11-237584 | 8/1999 |
| JP | 2011-013600 | 1/2011 |

OTHER PUBLICATIONS

Yasuhiro Takaki, "3D Display Technologies: From Glasses-Free Displays to Holography", Annual Review of Display Technology 2012, Nikkei Business Publications, Inc., 2012.

*Primary Examiner* — Jack Dinh
(74) *Attorney, Agent, or Firm* — McDermott Will & Emery LLP

(57) ABSTRACT

An image display device according to an aspect of the present disclosure includes: a display including light-emitting elements arrayed two-dimensionally, and having regions, in each of which a part of the light-emitting elements is located; a mirror lens array including mirror lenses, each of the mirror lenses being disposed correspondingly to one of the regions, reflecting light from the regions, and forming virtual images; and a beam splitter disposed between the display and the mirror lens array, the beam splitter transmitting a part of the light from the regions in a direction of the mirror lens array and reflecting a part of reflected light from the mirror lens array.

7 Claims, 16 Drawing Sheets

IMAGE DISPLAY DEVICE COMPRISING BEAM SPLITTER

BACKGROUND

1. Technical Field

The present disclosure relates to an image display device.

2. Description of the Related Art

Humans are capable of three-dimensionally perceiving images by (1) focal adjustment of the crystalline lens of the eye, (2) disparity of the eyes (difference in what is seen by the right eye and the left eye), (3) convergence of the eyes (movement of the eyes to cause the lines of view to intersect), and other like sensory perceptions. Generally displays used with gaming devices, televisions, and so forth, have a two-dimensional display face. The user can be made to three-dimensionally perceive images displayed on this display face (two-dimensional images) by using the effects of the above (1) through (3). Particularly, displays using the effects of the above (2) and (3) are commercially available. For example, Japanese Unexamined Patent Application Publication No. 8-194273 discloses a configuration using the effects of the above (2) and (3) by way of lenticular lenses.

FIG. 10 is a diagram schematically illustrating a three-dimensional image display device disclosed in Japanese Unexamined Patent Application Publication No. 8-194273. A two-dimensional light emitter 21 such as a liquid crystal display or the like is made up of a great number of pixels 21P. Each pixel 21P is divided into two regions; a region 21R and a region 21L. Lenticular lenses 20 are arrayed on the surface of the light emitter 21, correspondingly one-on-one to the pixels 21P.

Due to the light condensing effects of the lenticular lenses 20, light generated in the regions 21R of the pixels 21P forms an image at a condensing point 4R, and light generated in the regions 21L forms an image at a condensing point 4L. The regions 21R and regions 21L each display different images, taking disparity into consideration. By placing a human right eye and left eye at the respective condensing point 4R and condensing point 4L, the images are perceived as a three-dimensional image due to the effects of (2) and (3) described above. That is to say, the right eye only senses the image displayed at the regions 21R, and the left eye only senses the image displayed at the regions 21L. Disparity information (disparity of the two eyes) has been added to these two images. The lines of sight intersect by both the right eye and left eye being fixed on the surface of the light emitter 21 (convergence of the eyes).

SUMMARY

In one general aspect, the techniques disclosed here feature an image display device including: a display including light-emitting elements arrayed two-dimensionally, and having regions, in each of which a part of the light-emitting elements is located; a mirror lens array including mirror lenses, each of the mirror lenses being disposed correspondingly to one of the regions, reflecting light from the regions, and forming virtual images; and a beam splitter disposed between the display and the mirror lens array, the beam splitter transmitting a part of the light from the regions in a direction of the mirror lens array and reflecting a part of reflected light from the mirror lens array.

According to the above image display device, the other side of the image display device can be seen through the image display device as a background, and images from the image display device can be displayed upon this background. The image is perceived by adjustment of the focal point of the crystalline lenses of the eyes, so there is little optical load on the user.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
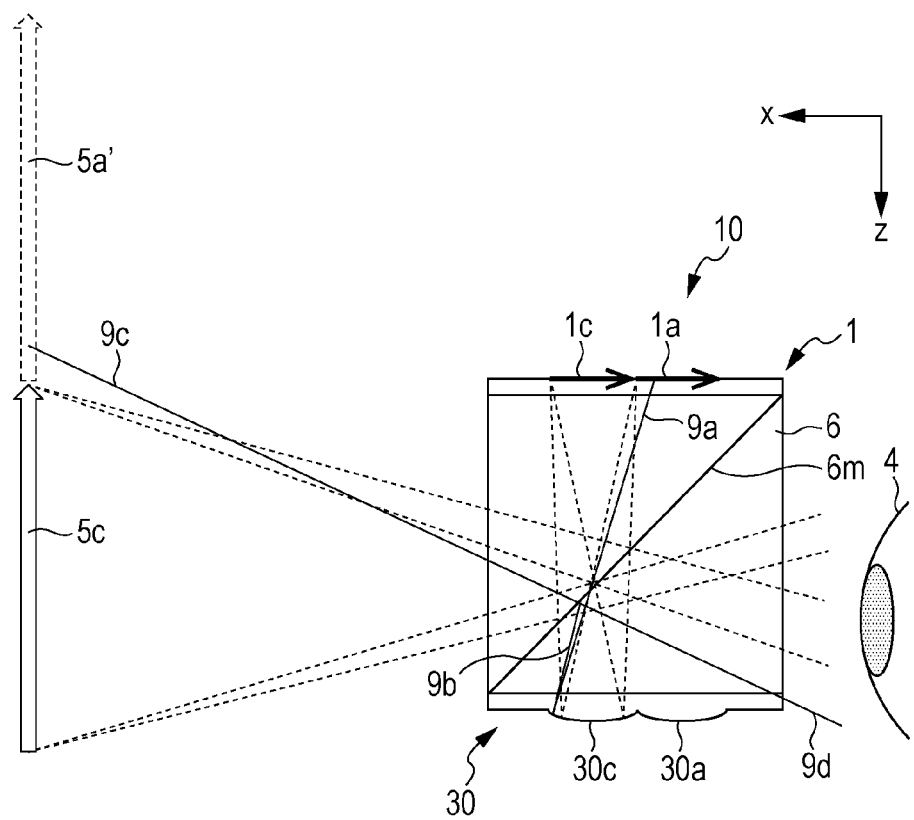
FIG. 1 is a cross-sectional diagram schematically illustrating the positional relationship of a display member, a half mirror, mirror lenses, and displayed image, and optical paths, in an image display device according to a first embodiment.

Prior to describing embodiments of the present disclosure, study cases will be described, in which the conventional art has been improved and studied. According to the three-dimensional image display device in Japanese Unexamined Patent Application Publication No. 8-194273, the eyes of the user 4 are focused on the surface of the light emitter 21 (focal point). On the other hand, the intersection of the lines of sight is situated at the position of the three-dimensional image, and accordingly is deviated from the surface of the light emitter 21. This means that in principle, the position of the focal point where the crystalline lenses of the eyes is adjusted, and the position of intersection of parallax of the eyes do not match. Accordingly, the viewing of the image is unnatural to the user, so the optical load on the user is great. The present inventors studied a configuration where multiple lenses with different focal distances are used to form virtual images at different positions (first and second study cases), as improvements on the conventional examples. These study cases will be described below with reference to the drawings. Note that in the following description, components which are the same or equivalent will be denoted by the same reference numerals.

First Study Case

Figure 11:
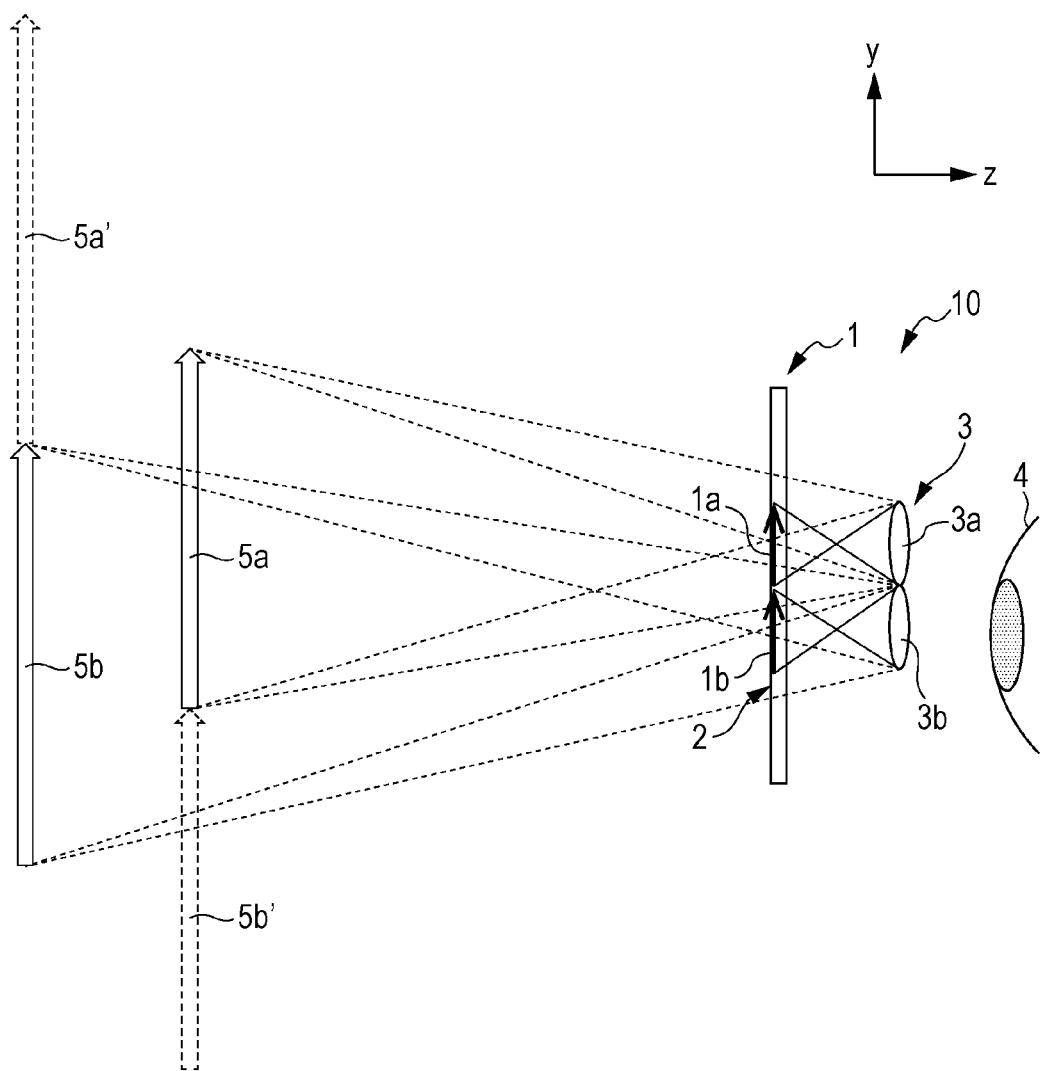
FIG. 11 is a cross-sectional view schematically illustrating the positional relationship of a display member, lenses, and displayed image, and optical paths, in a three-dimensional image display device according to a first study case.
Figure 12:
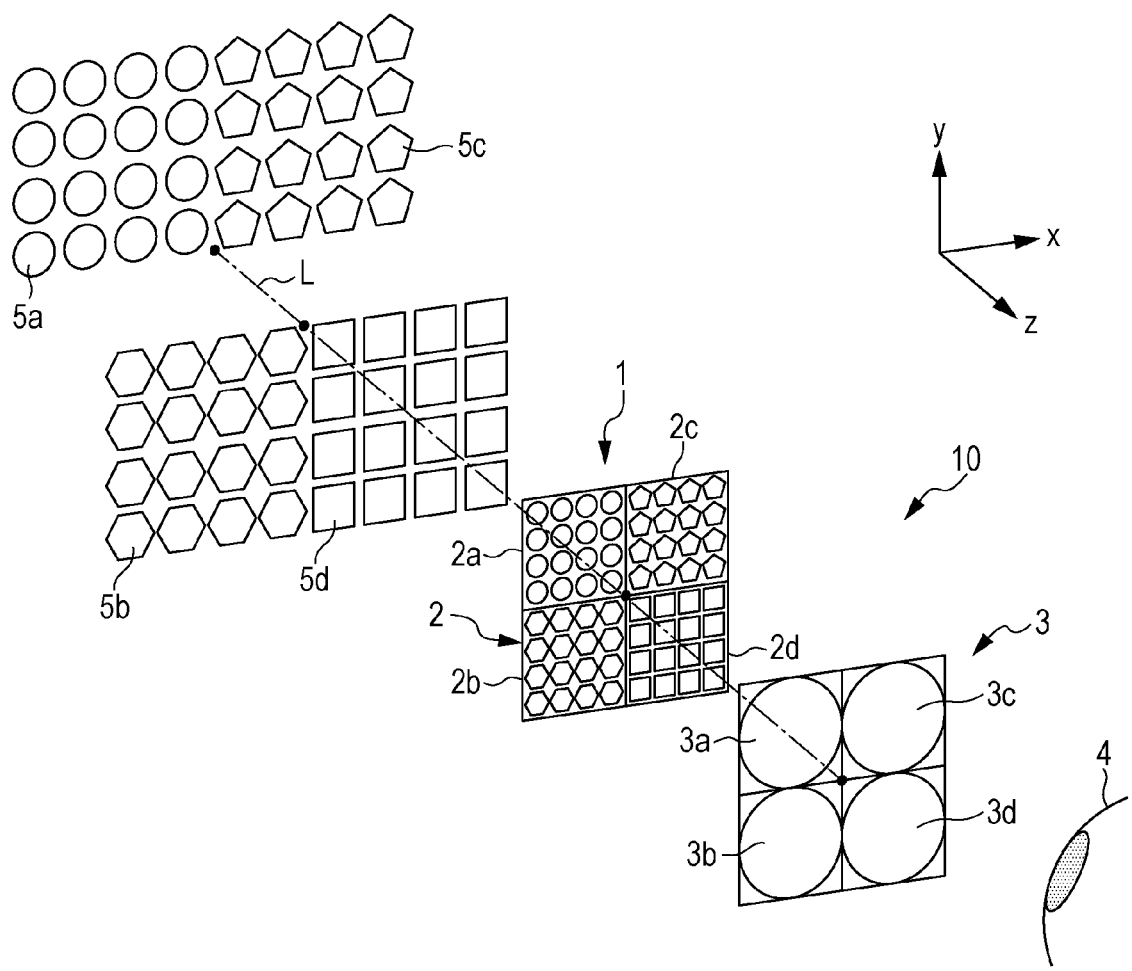
FIG. 12 is a three-dimensional representation schematically illustrating the positional relationship of a display member, lenses, and displayed image, in the first study case.

FIGS. 11 and 12 are diagrams schematically illustrating the configuration of an image display device 10 in the first study case. The image display device 10 has a display member 1 and a lens array 3. The lens array 3 illustrated in FIGS. 11 and 12 has four lenses 3a through 3d, as one example, but this is not restrictive, and the number of lenses included in the lens array 3 may be any number of two or more. In the attached drawings, an x-y plane is a plane parallel to the display face of the display member 1. The positive direction in the y-axis direction corresponds to the upper direction of the display member 1 and the image display device 10. The z axis is orthogonal to the x-y plane, and the z-axis direction corresponds to the depth direction of the display member 1, i.e., to the front-back direction of the image display device 10. The positive direction in the z-axis direction corresponds to the front of the image display device 10 (the direction from the display member 1 toward the user 4).

The display member 1 is, for example, a display such as a liquid crystal display, organic electroluminescent (EL) display, or the like. The display member 1 has multiple light-emitting elements (represented by circles, hexagons, pentagons, and squares) arrayed two-dimensionally on the display face, as illustrated in FIG. 12. In the present study case, eight light-emitting elements are arrayed in the x direction, and eight in the y direction, for a total of 64 light-emitting elements. The arrayed 64 light-emitting elements make up a basic region 2 (a set of four divided regions 2a, 2b, 2c, and 2d). The basic region 2 is part or all of the display face of the display member 1 where images are displayed. In a case where the basic region 2 is part of the display face, multiple regions that are the same as the basic region 2 are arrayed in the x direction and y direction, making up a single display face. Accordingly, display images corresponding to large screens can be formed. The light-emitting elements may be the smallest increment of the displayed image, such as a pixel or color pixel of the display member 1, or the like. Alternatively, a set of multiple pixels or color pixels of the same shape may be handled as a single light-emitting element.

The basic region 2 made up of multiple light-emitting elements arrayed two-dimensionally is divided into the multiple divided regions 2a, 2b, 2c, and 2d. Each divided region includes multiple light-emitting elements. Neither the number of divided regions included in the basic region 2, nor the number of light-emitting elements included in each divided region, are restricted in particular. In the present study case, each divided region includes four light-emitting elements in the x direction and four in the y direction, for a total of 16 light-emitting elements. Each of the four divided regions 2a through 2d individually display images 1a through 1d by multiple light-emitting elements emitting light.

The lens array 3 is disposed in close proximity to the surface of the display member 1. The lens array 3 includes individual lenses 3a, 3b, 3c, and 3d, disposed correspondingly to the divided regions 2a through 2d. Now, the expression here that one divided region and one lens "correspond" means that much of a light flux emitted from that divided region (e.g., half or more), enters that lens. For example, in a case where one divided region and one lens are disposed facing each other, the two can be said to be corresponding. In a case where the path of a light beam changes by an optical system, such as a mirror, beam splitter, or the like being placed between the divided region and the lens, the divided region and the lens are not facing each other. However, even in such a case, the two are corresponding if much of a light flux emitted from that divided region enters that lens.

The focal distances of the lenses 3a through 3d differ from each other. The focal distances of the lenses 3a, 3b, 3c, and 3d are, respectively, fa, fb, fc, and fd. Expressions fa>a, fb>a, fc>a, and fd>a, hold regarding the focal distances, where "a" represents the distance between each of the lenses 3a through 3d and the display member 1. The lens 3a forms the image 1a displayed at the corresponding divided region 2a as a virtual image 5a, at a position from the lens 3a by a distance ba determined by the following Expression (1) in the −z direction. The lens 3b forms the image 1b displayed at the corresponding divided region 2b as a virtual image 5b, at a position from the lens 3b by a distance bb determined by the following Expression (2) in the −z direction. The lens 3c forms the image 1c displayed at the corresponding divided region 2c as a virtual image 5c, at a position from the lens 3c by a distance bc determined by the following Expression (3) in the −z direction. The lens 3d forms the image 1d displayed at the corresponding divided region 2d as a virtual image 5d, at a position from the lens 3d by a distance bd determined by the following Expression (4) in the −z direction.

$$ba = fa \times a/(fa-a)$$ Expression (1)

$$bb = fb \times a/(fb-a)$$ Expression (2)

$$bc = fc \times a/(fc-a)$$ Expression (3)

$$bd = fd \times a/(fd-a)$$ Expression (4)

Note that FIG. 11 illustrates the display images 5a and 5c, and the display images 5b and 5d, aligned regarding display position in the z direction. Part or all of the display images may be aligned regarding display position in the z direction as illustrated in this example. In a case where the focal distances fa through fd differ for the lenses 3a through 3d, the positions where the display images 5a through 5d are formed will also differ in the thickness direction L (z direction) of the display member 1 for each divided region. As a result, the user 4 can be caused to perceive multiple display images with different distance perceptions. Accordingly, a usage is conceivable where the display image formed at a distance relatively far from the eyes of the user 4 is relegated displaying of a background image, while the display image formed at a distance relatively near to the eyes of the user 4 is relegated displaying of an object image such as a person or the like, for example.

The image display device 10 such as described above may be disposed correspondingly to either one or both of the right eye and left eye of the user 4. In a case where two image display devices 10 are disposed correspondingly to the two eyes of the user 4, different images regarding which disparity of the right and left eyes has been taken into consideration are displayed on the display members 1 of the image display devices 10. Thus, the user 4 can perceive stereoscopic images.

In the present study example, the user 4 views the displayed images 5a through 5d formed at different positions in the thickness direction L (z direction). That is to say, the focus (focal point) of the eyes of the user 4 is set at the positions of the displayed images 5a through 5d. The intersection of the lines of sight is also situated at the displayed images 5a through 5d. Accordingly, in principle, the position of the focal point where the crystalline lenses of the eyes is adjusted matches the position of intersection of parallax of the eyes. The present study example has little problem of an optical load on the user occurring as with the conventional technology, even when viewing multiple images with different perceptions of distance.

However, from the position of the user 4, an image can also be seen through each lens that does not belong to the divided region corresponding to that lens but to a divided region adjacent to the divided region corresponding to that lens. For example, looking through the lens 3b, not only the image 1b of the divided region 2b but also the image 1a of the adjacent divided region 2a can also be seen. That is to say, the user 4 not only sees multiple display images with difference distance perceptions (images 5a and 5b in the example in FIG. 11) but also unnecessary images (images 5a' and 5b' in the example in FIG. 11) adjacent to these images. The unnecessary image 5a' is a virtual image corresponding to the image 1a on the divided region 2a which can be seen through the lens 3b. The unnecessary image 5b' is a virtual image corresponding to the image 1b on the divided region 2b which can be seen through the lens 3a.

Second Study Case

Figure 13:
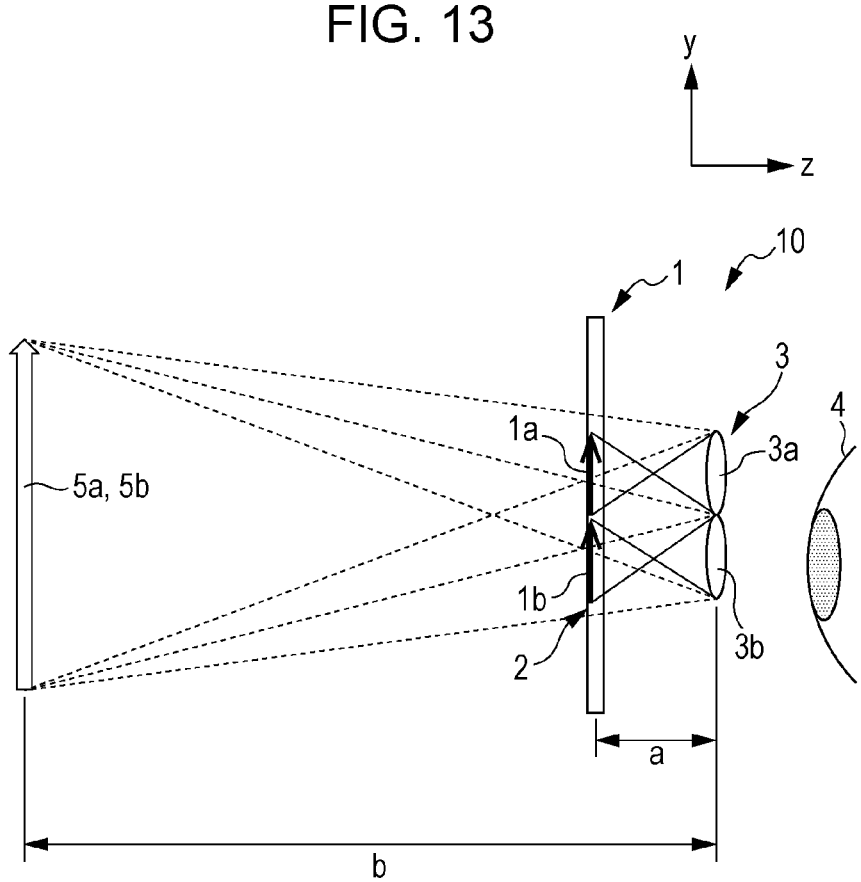
FIG. 13 is a cross-sectional view schematically illustrating the positional relationship of a display member, lenses, and displayed image, and optical paths, in a three-dimensional image display device according to a second study case.
Figure 14:
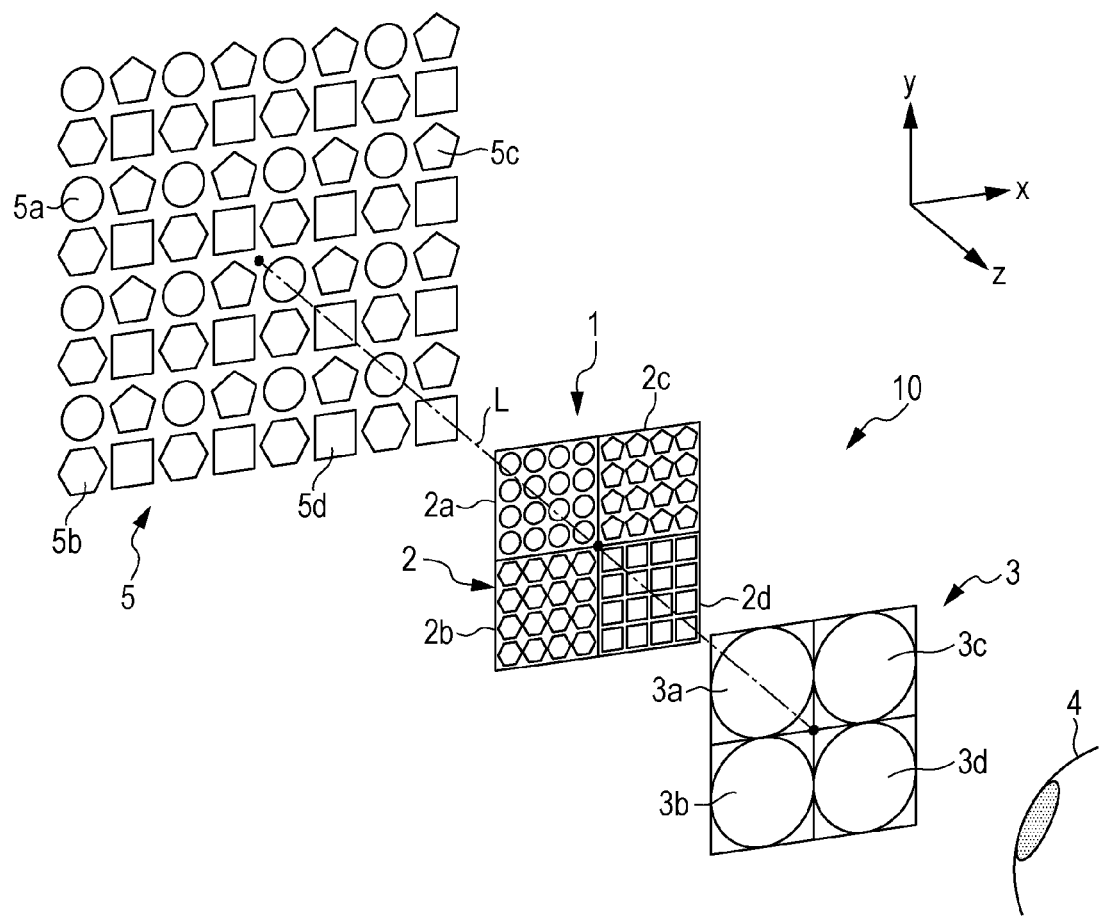
FIG. 14 is a three-dimensional representation schematically illustrating the positional relationship of a display member, lenses, and displayed image, in the second study case.

The present inventors also studied a second study case, as a modification of the first study case. FIGS. 13 and 14 are diagrams schematically illustrating the image display device 10 according to the second study case. This image display device 10 includes the display member 1 and lens array 3. The present study case differs from the first study case in the relationship between the image array method and the positions of forming the virtual images formed by the lenses, and the other configurations are the same. Accordingly, description of redundant content from the first study case may be omitted.

The display member 1 has multiple light-emitting elements arrayed two-dimensionally on the display face, as illustrated in FIG. 14. In the present study case, eight light-emitting elements are arrayed in the x direction, and eight in the y direction, for a total of 64 light-emitting elements. The arrayed 64 light-emitting elements make up a basic region 2. The light-emitting elements may be a pixel, a color pixel, or a set of pixels or color pixels of the same shape, of the display member 1.

The basic region 2 made up of multiple light-emitting elements arrayed two-dimensionally is divided into the multiple divided regions 2a, 2b, 2c, and 2d. Each divided region includes multiple light-emitting elements. Neither the number of divided regions included in the basic region 2, nor the number of light-emitting elements included in each divided region, are restricted in particular. In the present study case, each divided region includes four light-emitting elements in the x direction and four in the y direction, for a total of 16 light-emitting elements. Each of the four divided regions 2a through 2d individually display images 1a through 1d by multiple light-emitting elements emitting light.

Figure 15:
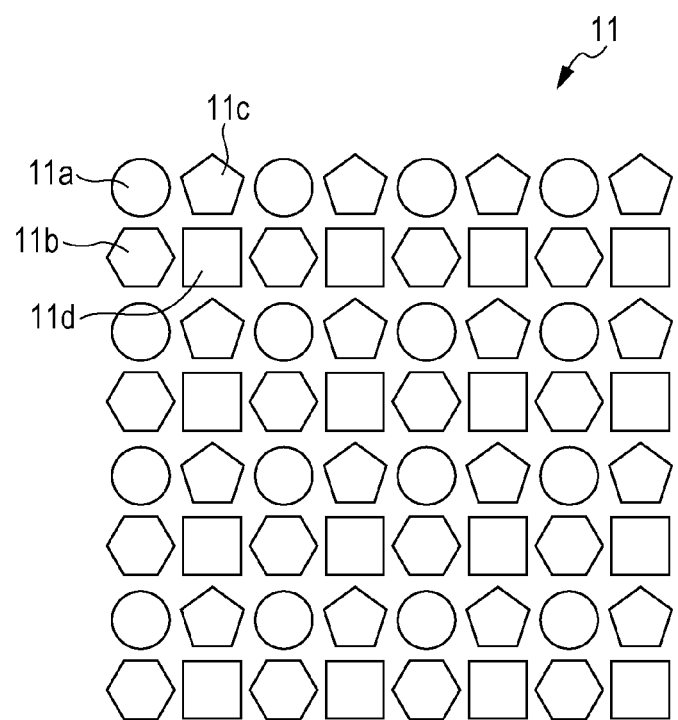
FIG. 15 is a diagram for describing a layout of pixel elements in an original image.

FIG. 15 illustrates an original image 11 of an image displayed on the display member 1. The original image 11 has eight pixel elements that are arrayed in the x direction, and eight in the y direction, for a total of 64 pixel elements. Of these pixel elements, pixels 11a (indicated by circles), pixels 11b (indicated by hexagons), pixels 11c (indicated by pentagons), and pixels 11d (indicated by squares), situated every other pixel in both the x direction and the y direction, are distinguished from each other. The image made up of the group of pixels 11a is compacted and displayed by the light-emitting elements in the divided region 2a. The image made up of the group of pixels 11b is compacted and displayed by the light-emitting elements in the divided region 2b. The image made up of the group of pixels 11c is compacted and displayed by the light-emitting elements in the divided region 2c. The image made up of the group of pixels 11d is compacted and displayed by the light-emitting elements in the divided region 2d.

The lens array 3 is disposed in close proximity to the surface of the display member 1. The lens array 3 includes individual lenses 3a, 3b, 3c, and 3d, disposed correspondingly to the divided regions 2a through 2d. The focal distance (f) is the same for all of the lenses 3a through 3d. An expression of f>a holds, where "a" represents the distance between each of the lenses 3a through 3d and the display member 1. Accordingly, the lenses 3a through 3d form the images 1a through 1d each displayed at the divided regions 2a through 2d as virtual images. The positions of the lenses 3a through 3d are adjusted so that the virtual images of the images 1a through 1d overlap. Accordingly, the pixel virtual images making up each of the display images 5a through 5d (respectively represented by circles, hexagons, pentagons, and squares) are arrayed at every other pixel on the image plane. The pixel virtual images are arrayed so as to fill in gaps between each other. Overall, the array of the display image 5 is the same as that of the pixels of the original image 11.

Figure 16A:
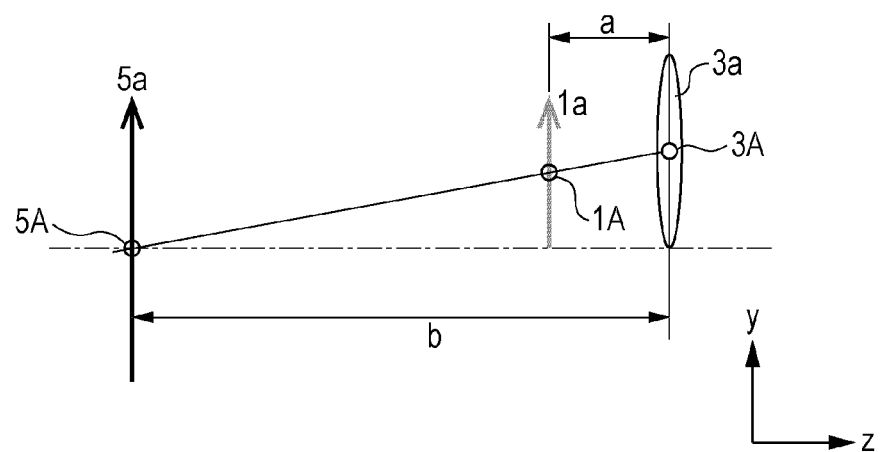
FIG. 16A is a diagram illustrating the positional relationship between the center of an image displayed in a divided region in the second study case, the center of the lens, and the center of the displayed image.

Now, the relationship between the center position of the image displayed in one divided region, and the center position of a lens, will be described with reference to FIGS. 16A and 16B. FIG. 16A schematically represents the positional relationship between the lens 3a, the image 1a displayed on the divided region 2a corresponding thereto, and the display image 5a, as one example. Here, "a" represents the distance between the lens 3a and the image 1a, and "b" represents the distance between the lens 3a and the display image 5a. According to the lens formula, the center 1A of the image 1a, the center 3A of the lens 3a, and the center 5A of the display image 5a, are on a straight line. In the same way, the center 1B of the image 1b, the center 3B of the lens 3b, and the center 5B of the display image 5b (i.e., 5A), are on a straight line. The center 1C of the image 1c, the center 3C of the lens 3c, and the center 5C of the display image 5c (i.e., 5A), are on a straight line, and the center 1D of the image 1d, the center 3D of the lens 3d, and the center 5D of the display image 5d (i.e., 5A), are on a straight line.

Figure 16B:
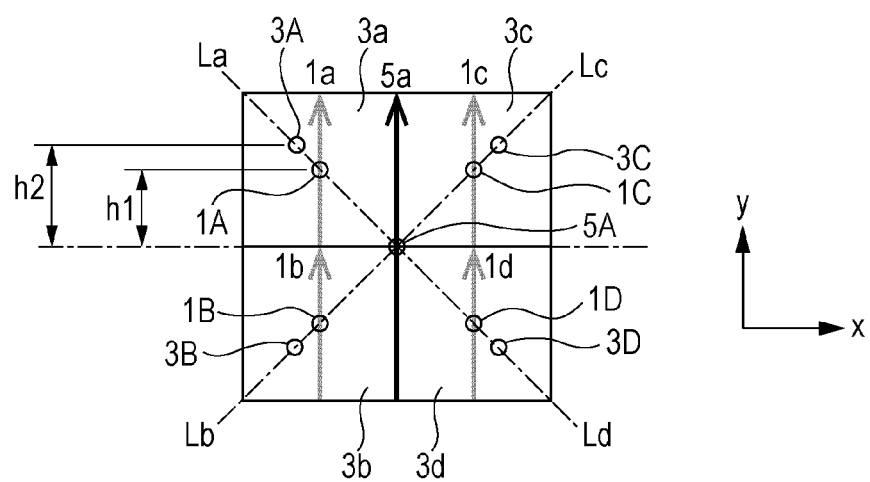
FIG. 16B is a diagram illustrating the positional relationship of the center of the image displayed in a divided region, the center of the lens, and the center of the displayed image, in the second study case, as viewed along the z axis from the positive side of the z axis.

FIG. 16B schematically illustrates the positional relationship of the centers 1A through 1D of the images 1a through 1d, the centers 3A through 3D of the lenses 3a through 3d, and the centers 5A through 5D of the display images 5a through 5d, as viewed along the z axis (optical axis) from the positive side of the z axis. When viewing the image 1a, lens 3a, and display image 5a along the z axis, the center 3A of the lens 3a, the center 1A of the image 1a, and the center 5A of the display image 5a, are disposed arrayed on a straight line La. In the same way, when viewing the image 1b, lens 3b, and display image 5b along the z axis, the center 3B of the lens 3b, the center 1B of the image 1b, and the center 5B of the display image 5b (i.e., 5A), are disposed arrayed on a straight line Lb. When viewing the image 1c, lens 3c, and display image 5c along the z axis, the center 3C of the lens 3c, the center 1C of the image 1c, and the center 5C of the display image 5c (i.e., 5A), are disposed arrayed on a straight line Lc, and when viewing the image 1d, lens 3d, and display image 5d along the z axis, the center 3D of the lens 3d, the center 1D of the image 1d, and the center 5D of the display image 5d (i.e., 5A), are disposed arrayed on a straight line Ld.

Figure 17A:
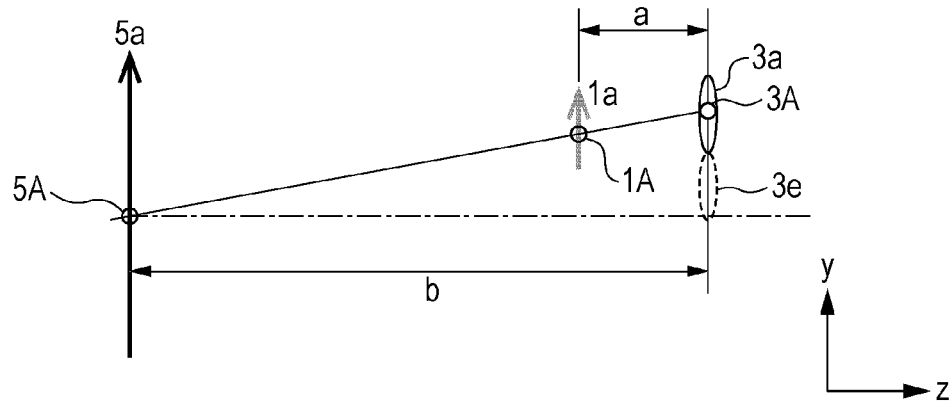
FIG. 17A is a diagram illustrating the positional relationship between the center of an image displayed in a divided region in a modification of the second study case, the center of the lens, and the center of the displayed image.
Figure 17B:
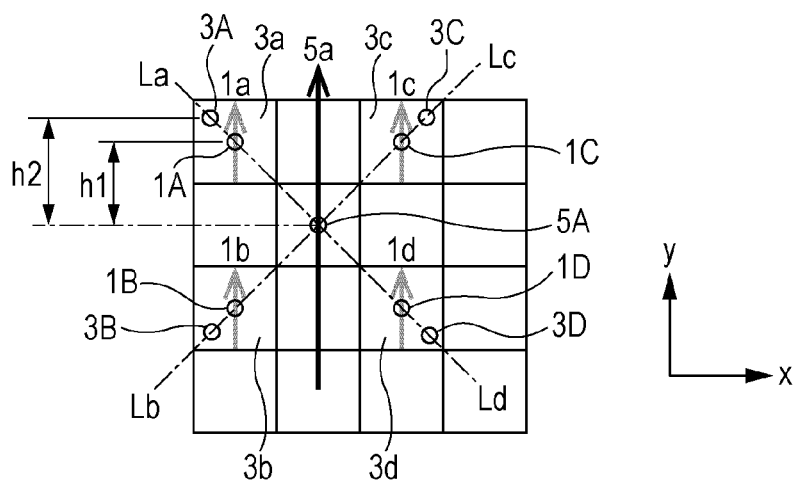
FIG. 17B is a diagram illustrating the positional relationship of the center of the image displayed in a divided region, the center of the lens, and the center of the displayed image, in a modification of the second study case, as viewed along the z axis from the positive side of the z axis.
Figure 17C:
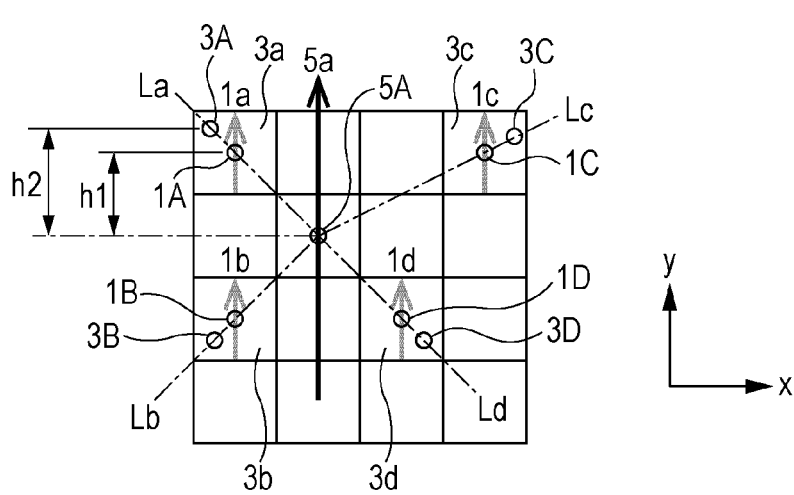
FIG. 17C is a diagram illustrating the positional relationship of the center of the image displayed in a divided region, the center of the lens, and the center of the displayed image, in another modification of the second study case, as viewed along the z axis from the positive side of the z axis.

Note that the lenses 3a through 3d do not necessarily have to be adjacent. FIGS. 17A and 17B are diagrams illustrating a configuration example where a separate lens 3e is interposed between the lenses 3a through 3d. In this configuration example, of the 16 divided regions arrayed in four rows and four columns, the divided regions of the first row and first column, the first row and third column, the third row and first column, and the third row and third column, correspond to the divided regions 2a, 2b, 2c, and 2d, respectively. Other multiple lenses having focal distances the same as or different from the lenses 3a through 3d are provided over the other divided regions. In a case where other multiple lenses having focal distances the same as the lenses 3a through 3d are provided, an arrangement may be made where those lenses and the lenses 3a through 3d complementary form a single display image. FIG. 17C illustrates another example of an array of multiple divided regions and multiple lenses. In the example in FIG. 17C, lenses 3a and 3c are disposed two apart in the x direction, and lenses 3b and 3d are disposed one apart in the x direction. The intervals at which the lenses 3a through 3d are disposed do not have to be constant. In the example in FIGS. 17B and 17C, there may be divided regions existing regarding which no corresponding lens is provided.

In this case as well, the center 1A (or 1B, 1C, 1D) of the image 1a (or 1b, 1c, 1d), the center 3A (or 3B, 3C, 3D) of the lens 3a (or 3b, 3c, 3d), and the center 5A (where 5A=5B=5C=5D) of the display image 5a (or 5b, 5c, 5d), are on a straight line, as illustrated in FIG. 17A. Also, when viewing along the z axis from the positive direction, the center 3A (or 3B, 3C, 3D) of the lens 3a (or 3b, 3c, 3d), the center 1A (or 1B, 1C, 1D) of the image 1a (or 1b, 1c, 1d), and the center 5A (where 5A=5B=5C=5D) of the display image 5a (or 5b, 5c, 5d), are disposed arrayed on a straight line La (or Lb, Lc, Ld), as illustrated in FIGS. 17B and 17C.

The following Expression (5)

$$h1/h2=(b-a)/b \quad \text{Expression (5)}$$

holds where h2 represents the distance in the y axis direction between the center 3A of the lens 3a and the center 5A of the display image 5a, and h1 represents the distance between the center 1A of the image 1a and the center 5A of the display image 5a. The same holds for the image 1b, image 1c, and image 1d, as well.

Moving the lenses or display member in the x, y, and z directions according to Expression (5) to move the center of the lenses and the center of the images displayed in the divided regions enables the positions of the display images to be freely adjusted. Accordingly, images displayed at multiple divided regions can be formed overlaid on the same image plane, thereby enabling the display image 5 of the same pixel array as the original image 11 illustrated in FIG. 15 to be formed.

The display images 5a, 5b, 5c, and 5d formed as described above are images actually formed at the position as seen from the eyes of the user 4. This satisfies the condition of (1) focal adjustment of the crystalline lens of the eye when viewing with one eye, and further satisfy the conditions of (2) disparity of the eyes and (3) convergence of the eyes when viewing with both eyes. Accordingly, the image appears natural, since the difference in distance is perceived through focal adjustment by the crystalline lens of the eye. When viewing with both eyes, the position of focusing and the position where the lines of sight of the eyes intersect agree, so the optical load on the user 4 is small.

The present study case enables the sizes of each of the lenses 3a through 3d to be reduced as compared with the conventional configuration where a display image visually recognized by the user is formed from an image displayed on the display face, using a single lens. Accordingly, the focal distance of each lens can be reduced, and so the device can be made smaller and thinner.

The first study case which is an improvement of the conventional technology, and the second study case which is a modification thereof, have thus been described. In each of these study cases, the image display device 10 is non-transparent, and the user 4 cannot see through to see the other side of the image display device 10. The present inventors have reached a new configuration that solves the problem of these study cases, and enables the other side of the image display device to be seen through the image display device while displaying images of the image display device on this background. The present disclosure includes image display devices according to the following Items.

Item 1

An image display device includes: a display including light-emitting elements arrayed two-dimensionally, and having regions, in each of which a part of the light-emitting elements is located; a mirror lens array including mirror lenses, each of the mirror lenses being disposed correspondingly to one of the regions, reflecting light from the regions, and forming virtual images; and a beam splitter disposed between the display and the mirror lens array, the beam splitter transmitting a part of the light from the of regions in a direction of the mirror lens array and reflecting a part of reflected light from the mirror lens array. The beam splitter may reflect the part of the reflected light from the mirror lens array in a direction of an observing eye of a user.

Item 2

The image display device according to Item 1 further includes: a condensing lens array including condensing lenses, disposed between the regions and the beam splitter, each of the condensing lenses corresponding to one of the regions.

Item 3

The image display device according to either Item 1 or 2, wherein each of the mirror lenses has a reflecting region that reflects a first incident light input to a part of lens surface of each of the mirror lenses, the part of the lens surface including an optical axis of each of the mirror lenses, and a transmitting region that transmits a second incident light input to another part of the lens surface.

Item 4

The image display device according to Item 2, wherein each of the mirror lenses has a reflecting region that reflects a first incident light input to a part of lens surface of each of the mirror lenses, the part of the lens surface including an optical axis of each of the mirror lenses, and a transmitting region that transmits a second incident light input to another part of the lens surface, and wherein transmitted light passing through each of the condensing lenses is input to the reflecting region.

Item 5

The image display device according to any one of Items 1 through 4 further includes: electronic shutters disposed between the display and the mirror lens array, each of the electronic shutters disposed correspondingly to one of the regions; and a control circuit that is electrically connected to the light-emitting elements and the electronic shutters and, in operation, controls a light-emitting state of the light-emitting elements and a transmittance of the electronic shutters, wherein, synchronously with a timing of causing an image to be displayed at one of the regions by controlling the light-emitting state of the light-emitting elements, the control circuit controls one of the electronic shutters that corresponds to the one of the regions to a transmitting state, and controls other electronic shutters adjacent to the electronic shutter corresponding to the one of the regions to a shielding state.

Item 6

The image display device according to Item 5, wherein, when displaying the image at the one of the regions, the control circuit displays the image in a manner extending into another adjacent region as well.

Item 7

The image display device according to any one of Items 1 through 6, wherein an optical distance between each of the mirror lenses and the corresponding one of the regions is smaller than a focal distance of each of the mirror lenses.

Item 8

An image display device includes: a display; a mirror lens array including mirror lenses disposed on paths of optical fluxes emitted from a display face of the display, each of the mirror lenses being disposed correspondingly to one of divided regions making up the display face, an optical distance between the mirror lenses and the divided regions being smaller than a focal distance of the mirror lenses; and a beam splitter disposed between the display and the mirror lens array, the beam splitter transmitting a part of light from the display in a direction of the mirror lens array and reflecting a part of reflected light from the mirror lens array in a direction of an observing eye of a user.

Embodiments of the present disclosure will be described below with reference to the drawings. The following description only relates to an example of the present disclosure, and the present disclosure is not restricted thereby.

First Embodiment

Figure 2:
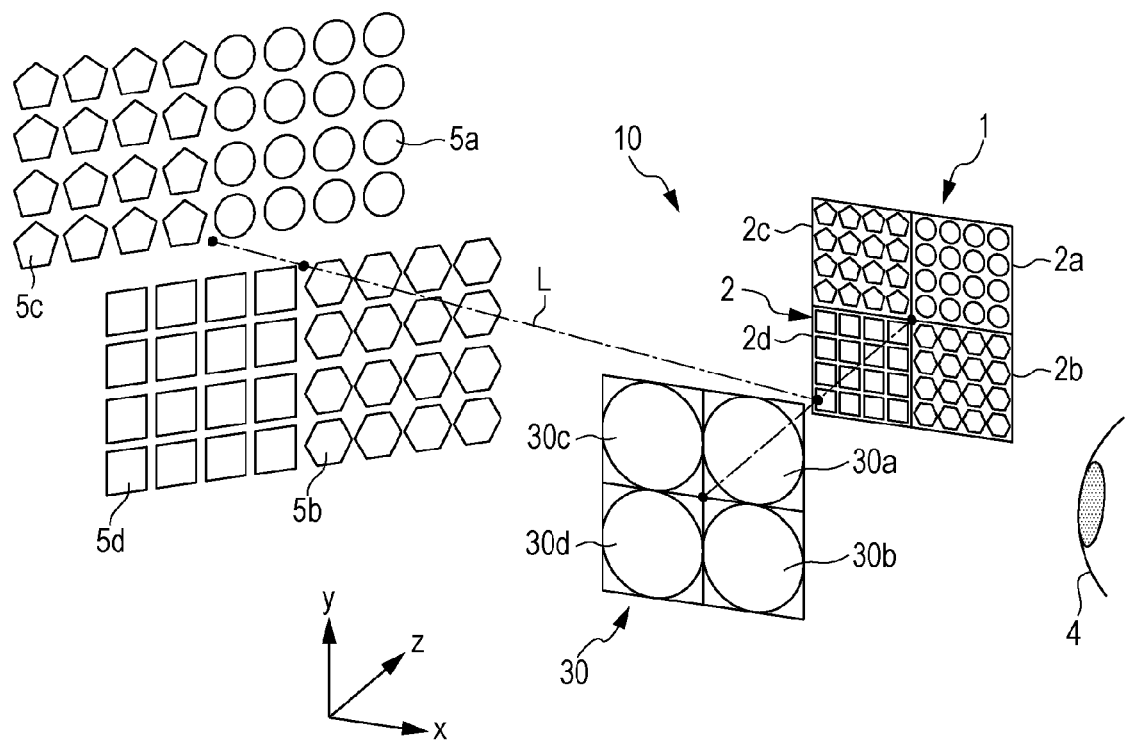
FIG. 2 is a three-dimensional representation schematically illustrating the positional relationship of the display member, mirror lenses, and displayed image, in the first embodiment.

FIGS. 1 and 2 are diagrams illustrating the configuration of an image display device 10 according to a first embodiment. The image display device 10 has a display member 1, a beam splitter (half mirror) 6, and a mirror lens array 30. The present embodiment is no different from the first study case except regarding the configuration that the refracting lens array 3 is replaced by the mirror lens array 30, and that the half mirror 6 is interposed between the display member 1 and the mirror lens array 30. Accordingly, description of repetitive content from the first study case may be omitted hereinafter.

Figure 8:
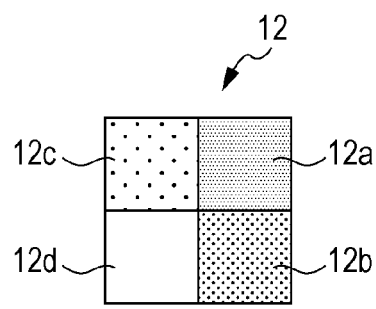
FIG. 8 is an upper view illustrating the configuration of the electronic shutters.

The display member 1 is, for example, a display such as a liquid crystal display, organic EL display, or the like. The display member 1 has multiple light-emitting elements (represented by circles, hexagons, pentagons, and squares) arrayed two-dimensionally on the display face, as illustrated in FIG. 8. In the present embodiment, eight light-emitting elements are arrayed in the x direction, and eight in the y direction, for a total of 64 light-emitting elements. The arrayed 64 light-emitting elements make up a basic region 2 (a set of four divided regions 2a, 2b, 2c, and 2d). The basic region 2 is part or all of the display face of the display member 1 where images are displayed. In a case where the basic region 2 is part of the display face, multiple regions that are the same as the basic region 2 are arrayed in the x direction and y direction, making up a single display face. Accordingly, display images corresponding to large screens can be formed. The light-emitting elements may be the smallest increment of the displayed image, such as a pixel or color pixel of the display member 1, or the like. Alternatively, a set of multiple pixels or color pixels of the same shape may be handled as a single light-emitting element.

The basic region 2 made up of multiple light-emitting elements arrayed two-dimensionally is divided into the multiple divided regions 2a, 2b, 2c, and 2d. Each divided region includes multiple light-emitting elements. Neither the number of divided regions included in the basic region 2, nor the number of light-emitting elements included in each divided region, are restricted in particular. In the present embodiment, each divided region includes four light-emitting elements in the x direction and four in the y direction, for a total of 16 light-emitting elements. Each of the four divided regions 2a through 2d individually display images 1a through 1d by multiple light-emitting elements emitting light.

Light emitted from the multiple light-emitting elements passes through a reflecting face 6m of the half mirror 6 and is cast into the mirror lens array 30. The mirror lens array 30 is a set of multiple reflecting lenses (mirror lenses). A metal film is formed over the entire lens surface, acting as a reflecting face. Light input to this face is reflected, and is input to the reflecting face 6m again. The light component reflected at the reflecting face 6m here is visually recognized by the user 4. The mirror lens array 30 is disposed in close proximity to the surface of the display member 1. The mirror lens array 30 includes individual mirror lenses 30a, 30b, 30c, and 30d, disposed correspondingly to the divided regions 2a through 2d. The focal distance differs for each of the mirror lenses 30a through 30d. The focal distances of the mirror lenses 30a, 30b, 30c, and 30d are, respectively, fa, fb, fc, and fd. The focal distances satisfy the relationships of fa>a, fb>a, fc>a, and fd>a, where "a" represents the distance between each of the lenses 30a through 30d and the display member 1. The mirror lens 30a forms the image 1a displayed at the divided region 2a as a virtual image 5a, at a position optically distanced from the mirror lens 30a by a distance ba determined by the above Expression (1). The mirror lens 30b forms the image 1b displayed at the divided region 2b as a virtual image 5b, at a position optically distanced from the mirror lens 30b by a distance bb determined by the above Expression (2). The mirror lens 30c forms the image 1c displayed at the divided region 2c as a virtual image 5c, at a position optically distanced from the mirror lens 30c by a distance bc determined by the above Expression (3). The mirror lens 30d forms the image 1d displayed at the divided region 2d as a virtual image 5d, at a position optically distanced from the mirror lens 30d by a distance bd determined by the above Expression (4). Here, the term "optically distanced" means that the distance measured along the path of the light ray (optical distance) is long.

The mirror lenses 30a through 30d thus form the display images 5a through 5d at different positions. Note that FIG. 2 illustrates the display images 5a and 5c, and the display images 5b and 5d, aligned regarding display position, but part or all of the display images may be aligned regarding display position in the z direction as illustrated in this example. In a case where the focal distances fa through fd differ for the lenses 3a through 3d, the positions where the display images 5a through 5d are formed will also differ in the thickness direction L (z direction) of the display member 1 for each divided region. As a result, the image display device 10 can cause the user 4 to perceive multiple display images with different distance perceptions. Accordingly, a usage is conceivable where the display image formed at a distance relatively far from the eyes of the user is relegated displaying of a background image, while the display image formed at a distance relatively near to the eyes of the user 4 is relegated displaying of an object image such as a person or the like, for example.

The image display device 10 such as described above may be disposed correspondingly to either one or both of the right eye and left eye of the user 4. In a case where two image display devices 10 are disposed correspondingly to the two eyes of the user 4, different images regarding which disparity of the right and left eyes has been taken into consideration are displayed on the display members 1 of the image display devices 10. Thus, the user 4 can perceive stereoscopic images.

The present embodiment enables the other side of the image display device 10 to be seen through the half mirror 6. Images with different distance perceptions can be displayed on this background by the image display device 10.

Figure 3:
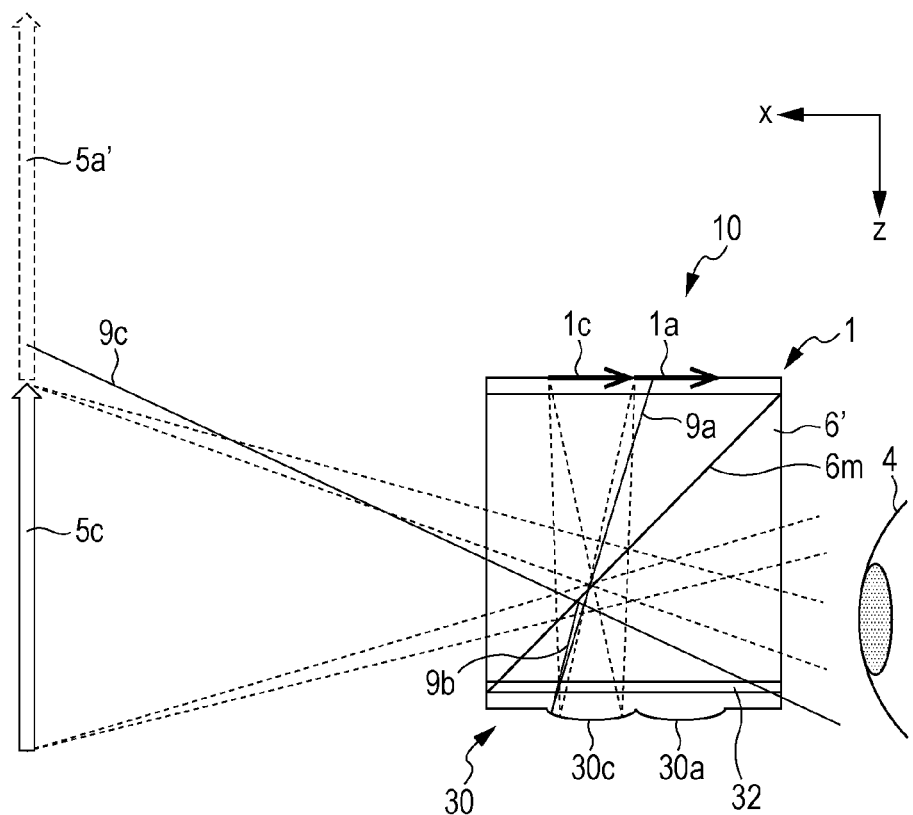
FIG. 3 is a cross-sectional diagram illustrating a modification of the first embodiment.

Although the present embodiment uses a half mirror 6 where the light transmittance and reflectance are both 50%, a beam splitter may be used where the light transmittance and reflectance are different. In a case where the display member 1 is a display that outputs polarized light like a liquid crystal display, a polarization beam splitter may be used. FIG. 3 is a diagram illustrating a configuration example using a polarization beam splitter 6'. This polarization beam splitter 6' is designed such that linearly polarized light emitted from the display member 1 is transmitted, and linearly polarized light orthogonal thereto is reflected. Disposing a quarter-wave plate 32 between the polarization beam splitter 6' and the mirror lens array 30 enables a virtual image to be formed as a brighter display image, in the same way as in the present embodiment.

Second Embodiment

Figure 4:
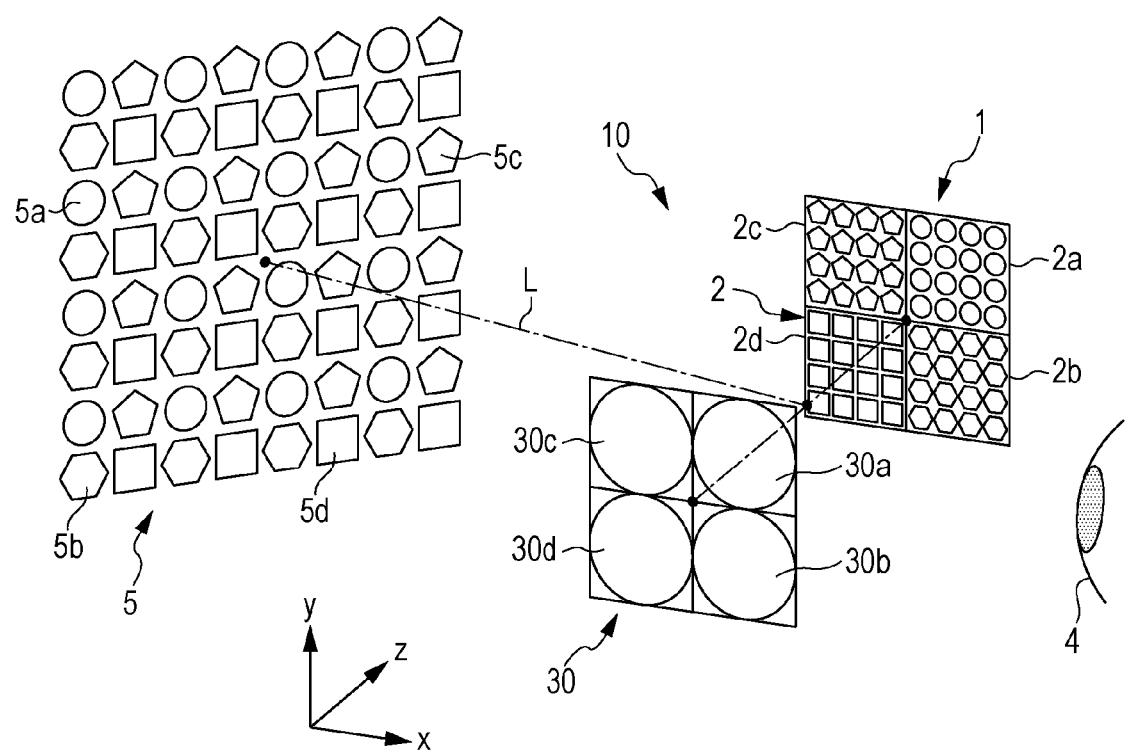
FIG. 4 is a three-dimensional representation schematically illustrating the positional relationship of a display member, mirror lenses, and displayed image, according to a second embodiment.

FIG. 4 is a diagram schematically illustrating an image display device 10 according to a second embodiment. The present embodiment differs from the first embodiment only regarding point that the image array method and the position of forming the virtual images differ from the first embodiment, and the other configurations are the same. Accordingly, description of redundant content from the first embodiment may be omitted.

The display member 1 has multiple light-emitting elements arrayed two-dimensionally on the display face. In the present embodiment, eight light-emitting elements are arrayed in the x direction, and eight in the y direction, for a total of 64 light-emitting elements. The 64 light-emitting elements make up a basic region 2. The light-emitting elements may be a pixel, a color pixel, or a set of multiple pixels or color pixels of the same shape, of the display member 1.

The basic region 2 made up of multiple light-emitting elements arrayed two-dimensionally is divided into the multiple divided regions 2a, 2b, 2c, and 2d. Each divided region includes multiple light-emitting elements. Neither the number of divided regions included in the basic region 2, nor the number of light-emitting elements included in each divided region, are restricted in particular. In the present embodiment, each divided region includes four light-emitting elements in the x direction and four in the y direction, for a total of 16 light-emitting elements. Each of the four divided regions 2a through 2d individually display images 1a through 1d by multiple light-emitting elements emitting light.

The original image 11 for displaying an image on the display member 1 is the same as that described with reference to FIG. 15. The original image 11 has eight pixel elements that are arrayed in the x direction, and eight in the y direction, for a total of 64 pixel elements. Of these pixel elements, pixels 11a (indicated by circles), pixels 11b (indicated by hexagons), pixels 11c (indicated by pentagons), and pixels 11d (indicated by squares), situated every other pixel in both the x direction and the y direction, are distinguished from each other. The image made up of the group of pixels 11a is compacted and displayed by the light-emitting elements in the divided region 2a. The image made up of the group of pixels 11b is compacted and displayed by the light-emitting elements in the divided region 2b. The image made up of the group of pixels 11c is compacted and displayed by the light-emitting elements in the divided region 2c. The image made up of the group of pixels 11d is compacted and displayed by the light-emitting elements in the divided region 2d.

The mirror lens array 30 is disposed in close proximity to the surface of the display member 1. The mirror lens array 30 includes lenses 30a, 30b, 30c, and 30d, disposed correspondingly to the divided regions 2a through 2d. The focal distance (f) is the same for all of the lenses 30a through 30d. The relationship of f>a is satisfied, where "a" represents the distance between each of the lenses 30a through 30d and the display member 1. Accordingly, the lenses 30a through 30d form the images 1a through 1d on the divided regions 2a through 2d as virtual images. The positions of the lenses 30a through 30d are adjusted so that the virtual images of the images 1a through 1d overlap. Pixel virtual images making up each of the display images 5a through 5d (respectively represented by circles, hexagons, pentagons, and squares) are arrayed at every other pixel on the image plane. The pixel virtual images are arrayed so as to fill in gaps between each other. Overall, the array of the virtual image 5 is the same as that of the pixels of the original image 11.

The relationship between the center position of images displayed in the divided regions and the center position of individual mirror lenses is the same as the relationship in the second study case described with reference to FIGS. 16A through 17C, so description will be omitted. The second embodiment enables the other side of the image display device to be seen through the half mirror 6 while displaying images of the image display device with difference distance perceptions on this background, in the same way as in the first embodiment.

Third Embodiment

Figure 5:
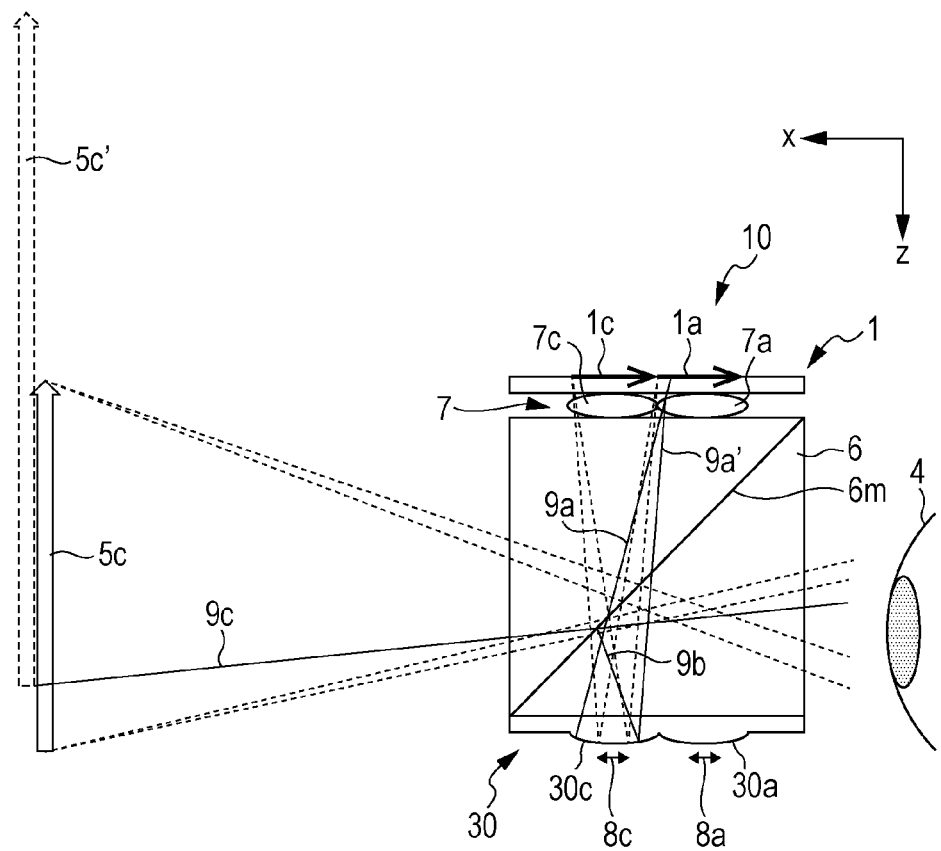
FIG. 5 is a cross-sectional diagram schematically illustrating the positional relationship of a display member, a half mirror, mirror lenses, and displayed image, and optical paths, in an image display device according to a third embodiment.

FIG. 5 is a cross-sectional diagram schematically illustrating the configuration of an image display device 10 according to a third embodiment. This image display device 10 includes the display member 1, a condensing lens array 7, the beam splitter (half mirror) 6, and the mirror lens array 30. The present embodiment differs from the first and second embodiments with regard to the point that the condensing lens array 7 is introduced, and that the structure of the reflecting region of the mirror lens array 30 differs. Other configurations are the same as the first or second embodiments. Accordingly, description of redundant content with the first and second embodiments may be omitted. Although the array of the multiple divided regions and the mirror lens array 30 may be optionally selected, description will be made here regarding an arrangement the same as that in the first embodiment.

As illustrated in FIG. 5, light generated at the light-emitting elements passes through the condensing lens array 7 interposed between the display member 1 and half mirror 6, then passes through a reflecting face 6m of the half mirror 6, and is input to the mirror lens array 30. The mirror lens array 30 includes multiple reflecting lenses (mirror lenses) 30a, 30b, 30c, and 30d, disposed correspondingly to the divided regions 2a through 2d.

Figure 6A:
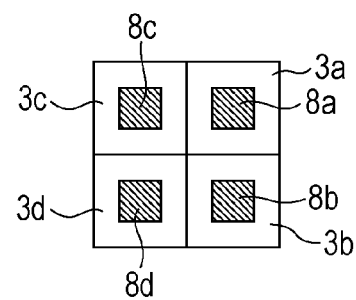
FIG. 6A is an upper view illustrating mirror lenses and reflective films thereupon.

FIG. 6A is a plan view schematically illustrating the configuration of mirror lenses 30a through 30d. Metal films 8a through 8d are formed on the surfaces of the lenses. The metal films 8a through 8d serve as reflecting faces. Portions other than the metal films 8a through 8d have light-transmitting properties. Thus, each mirror lens has a partial light reflecting region where incident light including an optical axis to the lens surface is reflected, and a transmitting region at the perimeter thereof where incident light is transmitted. The reflecting region reflects the incident light so as to be cast into the reflecting face 6m again. The component of light reflected at that time is perceived by the user 4.

The focal distance differs for each of the mirror lenses 30a through 30d. The focal distances of the mirror lenses 30a, 30b, 30c, and 30d are, respectively, fa, fb, fc, and fd. The focal distances satisfy the relationships of fa>a, fb>a, fc>a, and fd>a, where "a" represents the distance between each of the mirror lenses 30a through 30d and the display face of the display member 1. The mirror lens 30a forms the image 1a displayed at the divided region 2a as a virtual image 5a, at a position optically distanced from the mirror lens 30a by a distance ba determined by the above Expression (1). The mirror lens 30b forms the image 1b displayed at the divided region 2b as a virtual image 5b, at a position optically distanced from the mirror lens 30b by a distance bb determined by the above Expression (2). The mirror lens 30c forms the image 1c displayed at the divided region 2c as a virtual image 5c, at a position optically distanced from the mirror lens 30c by a distance bc determined by the above Expression (3). The mirror lens 30d forms the image 1d displayed at the divided region 2d as a virtual image 5d, at a position optically distanced from the mirror lens 30d by a distance bd determined by the above Expression (4).

The mirror lenses 30a through 30d thus form the display images 5a through 5d at different positions. Note that FIG. 5 only illustrates the virtual image 5c and the optical paths related thereto. The focal distances fa through fd differ for the mirror lenses 30a through 30d at each divided region, so the positions where the display images 5a through 5d are formed also differ in the thickness direction L of the display member 1 for each divided region. As a result, the user 4 can be caused to perceive multiple display images with different distance perceptions.

The condensing lens array 7 includes individual condensing mirror lenses 7a, 7b, 7c, and 7d, disposed correspondingly to the divided regions 2a, 2b, 2c, and 2d, respectively. The condensing lens array 7 acts such that the range of the light fluxes emitted from the light emission points of the images 1a through 1d displayed on the divided regions 2a through 2d is narrowed. These light fluxes are contained within the region around the middle of each mirror lens at the reflecting face of the mirror lenses 30a through 30d. The region where the metal film 8 is formed in the present embodiment is restricted to these regions 8a through 8d near the middle. Incident light to the lenses is not reflected at other regions and is transmitted.

When viewed from the position of the user 4 in the first and second embodiments, not only the image of the divided region corresponding to each lens, but also images of adjacent divided regions can be seen. For example, in FIG. 1, not only the image 1c displayed at the divided region 2c from the mirror lens 30c, but also the image 1a at the adjacent divided region 2a can be seen. For example, a light ray 9a that has been emitted from the image 1a is reflected at the mirror lens 30c, and thereafter traces optical path 9b and optical path 9d and enters the eye of the user 4. Accordingly, an unnecessary image 5a' adjacent to the display image 5c is formed on an extension 9c in the opposite direction of the optical path 9d. Conversely, as illustrated in FIG. 5, the optical path of the light ray emitted from the one point of the image 1a (and an extension 9a thereof) is bent by refraction at the condensing lens 7a (and becomes a light ray 9a'), is reflected at a mirror lens 30c, and traces the optical paths 9b and 9c. An image 5a' that is spread wide is formed on the image plane. This spreading reduces the luminance of the image 5a', and accordingly the image 5a' becomes less conspicuous. Further, the region where the metal film 8 is formed is restricted, so the probability that the incident position of the light ray 9a' will deviate from the reflecting region 8c is high, and accordingly the luminance of the image 5a' is further effectively reduced. Accordingly, the present embodiment can remove unnecessary image adjacent to the display image, in addition to the advantage of being able to see through to the other side of the image display device 10.

Figure 6B:
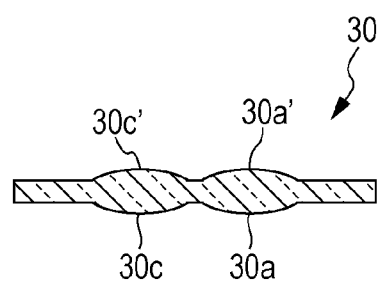
FIG. 6B is a cross-sectional view illustrating mirror lenses in a modification of the third embodiment.

The mirror lenses are reflecting lenses so there is not occurrence of chromatic aberration. However, slight chromatic aberration does occur due to the refraction at the condensing lens array 7. The input side of the mirror lens array 30 (the side opposite to the output side) may be provided with refracting properties as well, to cancel out this chromatic aberration. For example, the incident light to the mirror lenses 30a through 30d may be subjected to refraction on the incoming path to the mirror lenses 30a through 30d (when being input) and the return path (when being reflected) by providing lens forms 30a' through 30d' on the input side of the mirror lenses 30a through 30d, thereby correction chromatic aberration at the individual condensing lenses 7a through 7d. Although the lens forms 30a' through 30d' are upward protrusions in the example in FIG. 6B, these may be downward protrusions depending on the design.

Fourth Embodiment

Figure 7:
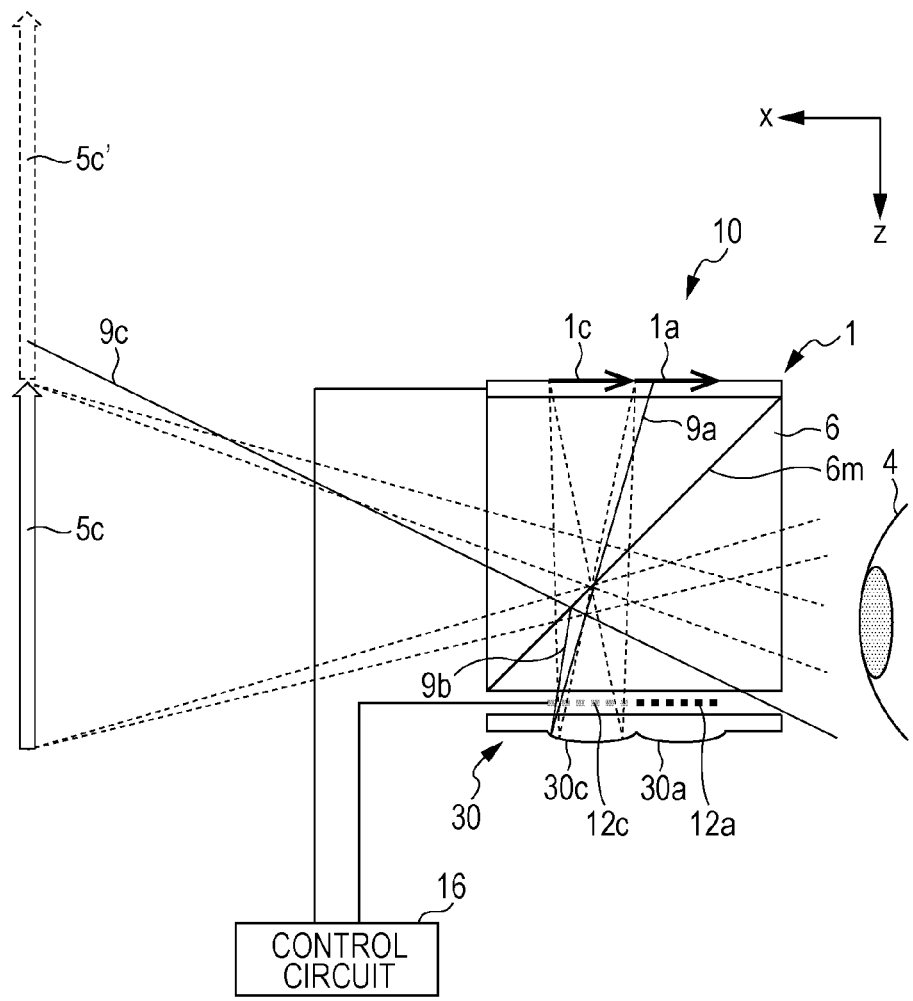
FIG. 7 is a cross-sectional diagram schematically illustrating the positional relationship of a display member, a half mirror, electronic shutters, mirror lenses, and displayed image, and optical paths, in an image display device according to a fourth embodiment.

FIG. 7 is a cross-sectional view illustrating the configuration of the image display device 10 according to a fourth embodiment. This image display device 10 includes the display member 1, beam splitter (half mirror 6), multiple electronic shutters 12, the mirror lens array 30, and a control circuit 16. The present embodiment differs from the first through third embodiments with regard to the point that the electronic shutters 12 are interposed, and that the control circuit 16 controls the display member 1 and the electronic shutters 12. Other configurations are the same as the first through third embodiments, and accordingly redundant description will be omitted. Description will be made here assuming that all components are the same as those in the first embodiment except for the electronic shutters 12.

FIG. 8 is a plan view illustrating the configuration of the multiple electronic shutters 12. The multiple electronic shutters 12 include individual electronic shutters 12a, 12b, 12c, and 12d, disposed correspondingly to the divided regions 2a, 2b, 2c, and 2d. The electronic shutters 12a through 12d can independently switch transmission of light at each region on and off. Here, "on" means a state where the transmittance of light is relatively high (transmitting state), and "off" means a state where the transmittance of light is relatively low (shielded state). The transmitting state is not restricted to a state of 100% transmittance, and includes a transmittance that is somewhat high. In the same way, the shielded state is not restricted to a state of 0% transmittance, and includes a transmittance that is somewhat low.

The electronic shutter 12 has a structure where a thin layer formed sandwiched between transparent electrodes between a pair of linear polarizers is filled with liquid crystal. The polarization direction of the transmitted light is rotated by applying the pair of transparent electrodes applying voltage to the liquid crystal sandwiched therebetween, thus enabling the transmitted light to be switched on and off. The multiple electronic shutters can be configured by patterning and dividing one of the transparent electrodes, and individually controlling voltage. In a case where the display member 1 is a light-emitting member of linearly polarized light such as a liquid crystal display, the linear polarizers at the display member side may be omitted. The half mirror 6 may be a polarization beam splitter, with a quarter-wave plate disposed between the polarization beam splitter and the electronic shutter 12. The p-polarized light emitted from the liquid crystal display passes through the polarization beam splitter and the quarter-wave plate and becomes circularly polarized light, and transmission of light is switched on and off at the electronic shutter 12. Light that has passed through the electronic shutter 12 and reflected at the mirror lens array 30 passes through the electronic shutter 12 again, becomes s-polarized when passing through the quarter-wave plate, is reflected at the polarization beam splitter, and enters the eye of the user 4.

The control circuit 16 is electrically connected to the light-emitting elements and the multiple electronic shutters 12. The control circuit 16 can control the emission state of the multiple light-emitting elements and the transmission properties of the multiple electronic shutters 12. More specifically, synchronously with the timing to display an image at one of the multiple divided regions, the control circuit 16 places the one of the multiple electronic shutters 12 corresponding to that divided region in a transmitting state, while placing the other electronic shutters adjacent to that electronic shutter in a shielded state.

The placement of lenses and divided regions in the first embodiment has independent images displayed at each of the divided regions 2a through 2d. Accordingly, any single region can be lit and the other regions not lit. The placement of lenses and divided regions in the second embodiment enables any region to be lit by time division, and the other regions not lit. Synchronizing the on and off (emitting and non-emitting) of the divided regions 2a through 2d with the on and off (transmitting and shielding) of the corresponding individual electronic shutters 12a through 12d enables adjacent divided regions emitting at the same time to be prevented. Thus, images from adjacent divided regions are not visible through the lenses 30a through 30d. Unlike in the first embodiment, adjacent unnecessary images (e.g., images 5a' and 5b' in FIG. 1) are not seen in the display image.

The light-emitting regions formed of the multiple light-emitting elements that display the individual images (1a, 1b, 1c, 1d, etc.) may extend beyond divided regions, and may straddle multiple divided regions. In other words, when displaying an image on one of the multiple divided regions, the control circuit 16 may also display that image extending into another adjacent divided region as well.

Figure 9A:
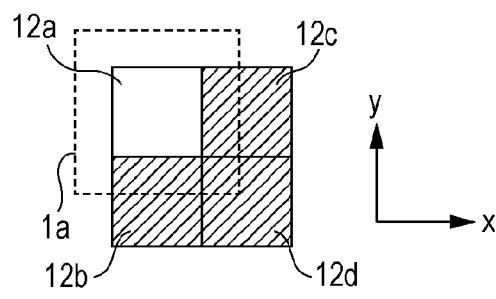
FIG. 9A is an upper view illustrating the range of a displayed image and a first state of the electronic shutters.
Figure 9B:
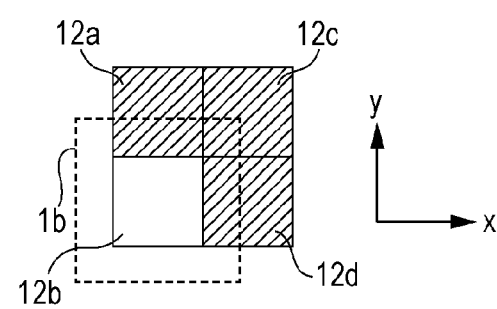
FIG. 9B is an upper view illustrating the range of a displayed image and a second state of the electronic shutters.
Figure 9C:
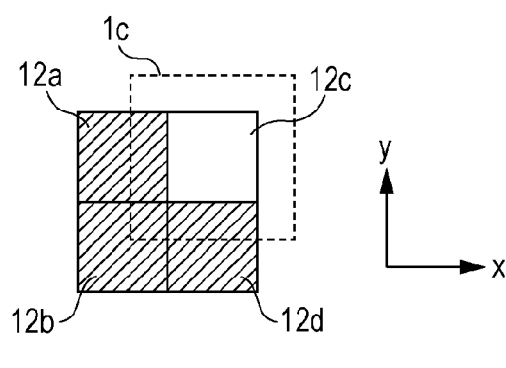
FIG. 9C is an upper view illustrating the range of a displayed image and a third state of the electronic shutters.

For example, as illustrated in FIGS. 9A through 9D, an individual image may be displayed in a region larger than one divided region. In this case, one image is displayed straddling multiple divided regions. In a state where the image 1a is displayed as illustrated in FIG. 9A, the surrounding images (1b, 1c, 1d, etc.) are not displayed, so the image 1a can be displayed extending from the divided region 2a into the surrounding divided regions. At this time, the electronic shutter 12a is on and the surrounding electronic shutters (12b, 12c, 12d, etc.) are off, so the image 1a appears to have a wide field angle when viewed from the user 4. In the same way, in a state where the image 1b is displayed as illustrated in FIG. 9B, the surrounding images (1c, 1d, 1a, etc.) are not displayed, so the image 1b can be displayed extending from the divided region 2b into the surrounding divided regions. At this time, the electronic shutter 12b is on and the surrounding electronic shutters (12c, 12d, 12a, etc.) are off, so the image 1b appears to have a wide field angle when viewed from the user 4. Also, in a state where the image 1c is displayed as illustrated in FIG.

Figure 9D:
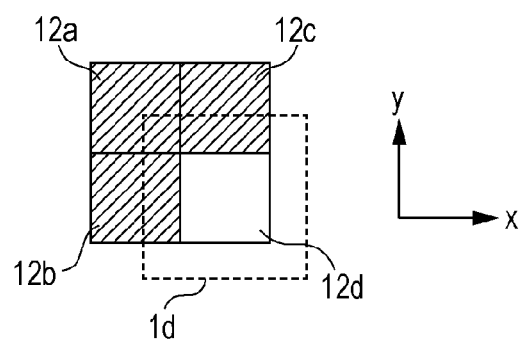
FIG. 9D is an upper view illustrating the range of a displayed image and a fourth state of the electronic shutters.
Figure 10:
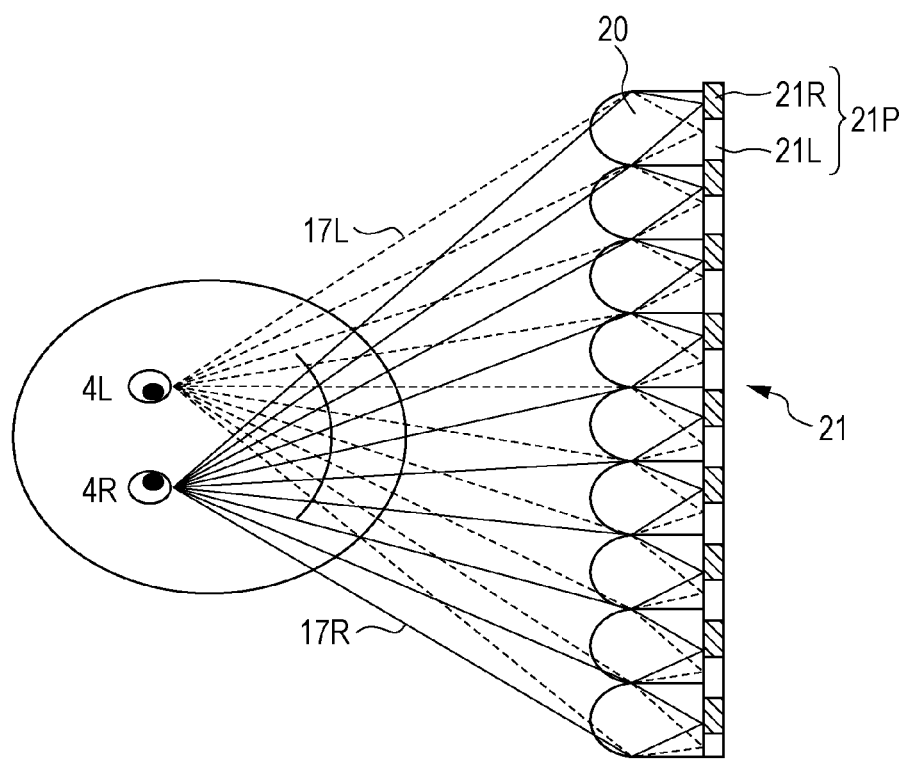
FIG. 10 is a diagram illustrating the structure and optical paths of a conventional three-dimensional image display device.

9C, the surrounding images (1d, 1a, 1b, etc.) are not displayed, so the image 1c can be displayed extending from the divided region 2c into the surrounding divided regions. At this time, the electronic shutter 12c is on and the surrounding electronic shutters (12d, 12a, 12b, etc.) are off, so the image 1c appears to have a wide field angle when viewed from the user 4. Further, in a state where the image 1d is displayed as illustrated in FIG. 9D, the surrounding images (1a, 1b, 1c, etc.) are not displayed, so the image 1d can be displayed extending from the divided region 2d into the surrounding divided regions. At this time, the electronic shutter 12d is on and the surrounding electronic shutters (12a, 12b, 12c, etc.) are off, so the image 1d appears to have a wide field angle when viewed from the user 4. Using this method enables the field angle of each image to be freely enlarged and reduced. Also, multiple images displayed on almost the entire screen of the display can be projected spatially with distances changed by time division, so substantial super-resolution (an image expression exceeding the number of pixels of the display) can be realized.

Thus, according to the present embodiment, not only the image display device be seen through to the other side, but also unnecessary images adjacent to the display image can be suppressed, and the field angle can be freely enlarged and reduced.

What is claimed is:

1. An image display device comprising:
a display including light-emitting elements arrayed two-dimensionally, and having regions, in each of which a part of the light-emitting elements is located;
a mirror lens array including mirror lenses, each of the mirror lenses being disposed correspondingly to one of the regions, reflecting light from the regions, and forming virtual images; and
a beam splitter disposed between the display and the mirror lens array, the beam splitter transmitting a part of the light from the regions in a direction of the mirror lens array and reflecting a part of reflected light from the mirror lens array.

2. The image display device according to claim 1, further comprising:
a condensing lens array including condensing lenses, disposed between the regions and the beam splitter, each of the condensing lenses corresponding to one of the regions.

3. The image display device according to claim 1, wherein each of the mirror lenses has
a reflecting region that reflects a first incident light input to a part of lens surface of each of the mirror lenses, the part of the lens surface including an optical axis of each of the mirror lenses, and
a transmitting region that transmits a second incident light input to another part of the lens surface.

4. The image display device according to claim 2, wherein each of the mirror lenses has
a reflecting region that reflects a first incident light input to a part of lens surface of each of the mirror lenses, the part of the lens surface including an optical axis of each of the mirror lenses, and
a transmitting region that transmits a second incident light input to another part of the lens surface,
and wherein transmitted light passing through each of the condensing lenses is input to the reflecting region.

5. The image display device according to claim 1, further comprising:
electronic shutters disposed between the display and the mirror lens array, each of the electronic shutters disposed correspondingly to one of the regions; and
a control circuit that is electrically connected to the light-emitting elements and the electronic shutters and, in operation, controls a light-emitting state of the light-emitting elements and a transmittance of the electronic shutters,
wherein, synchronously with a timing of causing an image to be displayed at one of the regions by controlling the light-emitting state of the light-emitting elements, the control circuit controls one of the electronic shutters that corresponds to the one of the regions to a transmitting state, and controls other electronic shutters adjacent to the electronic shutter corresponding to the one of the regions to a shielding state.

6. The image display device according to claim 5, wherein, when displaying the image at the one of the regions, the control circuit displays the image in a manner extending into another adjacent region as well.

7. The image display device according to claim 1, wherein an optical distance between each of the mirror lenses and the corresponding one of the regions is smaller than a focal distance of each of the mirror lenses.

* * * * *